US007287819B2

(12) United States Patent
McNeil

(10) Patent No.: US 7,287,819 B2
(45) Date of Patent: Oct. 30, 2007

(54) VEHICLE WHEEL AND ADAPTER

(76) Inventor: Steven D. McNeil, 1561 S. Vineyard Ave., Ontario, CA (US) 91761

( * ) Notice: Subject to any disclaimer, the term of this patent is extended or adjusted under 35 U.S.C. 154(b) by 0 days.

(21) Appl. No.: 11/064,326

(22) Filed: Feb. 22, 2005

(65) Prior Publication Data

US 2006/0186727 A1    Aug. 24, 2006

(51) Int. Cl.
    *B60B 27/00*    (2006.01)
(52) U.S. Cl. .................. 301/35.629; 301/35.621
(58) Field of Classification Search ............. 301/5.21, 301/35.63, 35.58, 35.62, 111, 114, 35.629, 301/110.01, 35.55, 35.54, 110.04, 9.1, 35.621, 301/35.623
    See application file for complete search history.

(56) References Cited

U.S. PATENT DOCUMENTS

| | | | |
|---|---|---|---|
| 1,361,076 A * | 12/1920 | Lively et al. ............. 301/35.54 |
| 1,365,896 A * | 1/1921 | Duffy .................... 301/63.101 |
| 1,615,253 A * | 1/1927 | Baker ...................... 301/35.54 |
| 2,779,630 A * | 1/1957 | Klinker ................ 301/35.629 |
| 3,017,224 A * | 1/1962 | Palmer ...................... 301/5.21 |
| 3,459,455 A * | 8/1969 | Penniman, Jr. et al. ...... 301/9.1 |
| 3,759,576 A | 9/1973 | Richter |
| 3,820,851 A * | 6/1974 | Longo et al. .......... 301/35.629 |
| 3,834,766 A * | 9/1974 | Thousand ............. 301/35.629 |
| 4,135,765 A * | 1/1979 | Hardwicke ................ 301/36.1 |
| 4,165,904 A | 8/1979 | Reppert |
| 4,537,449 A * | 8/1985 | Hayashi ................... 301/35.63 |
| 5,636,905 A * | 6/1997 | Pagacz .................... 301/35.63 |
| 5,785,391 A | 7/1998 | Parry et al. |
| 6,238,009 B1 * | 5/2001 | Lovitt, Jr. .............. 301/35.629 |
| 6,626,502 B1 * | 9/2003 | Petrak ................... 301/35.631 |
| 6,685,275 B2 | 2/2004 | Gorges et al. |

* cited by examiner

*Primary Examiner*—Russell D. Stormer
(74) *Attorney, Agent, or Firm*—Michael Fedrick; Shannon S. Imlay; Sheldon Mak Rose & Anderson

(57) ABSTRACT

A vehicle wheel adapter system for mounting different wheel hubs with protruding lugs, while allowing for quick assembly and disassembly can comprise a rim having a periphery for supporting a tire, a web plate for mounting on the opposed side of the rim, a plurality of inwardly projecting mounting bolts for placement through the web plate holes, an adapter plate having a first series of spaced apart bores for receiving the lugs, a second series of spaced apart bores for receiving the mounting bolts, and fasteners for fastening the adapter plate to the lugs and the bolts.

13 Claims, 5 Drawing Sheets

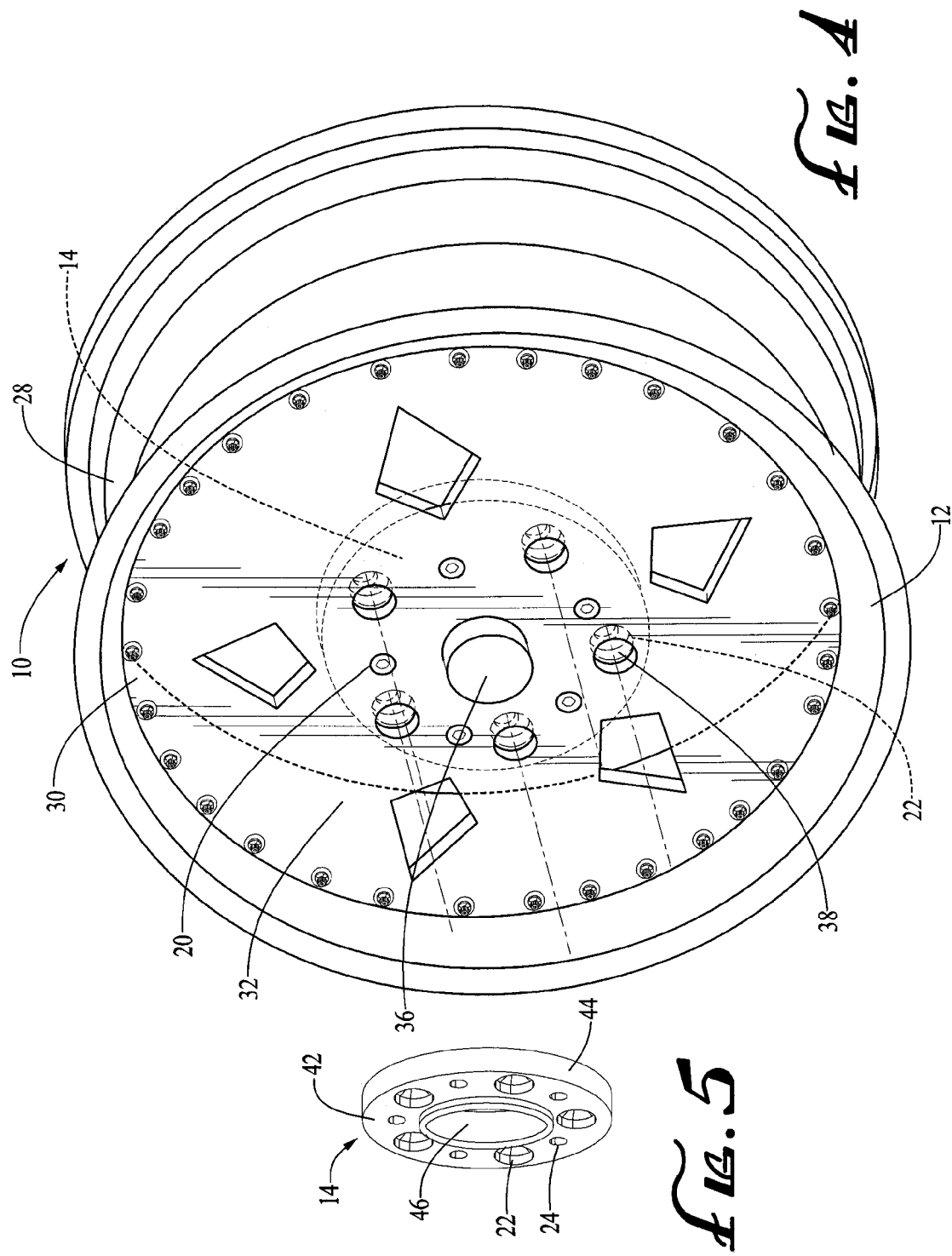

VEHICLE WHEEL AND ADAPTER

BACKGROUND

In the automobile industry, decorative wheels are commonly used instead of standard wheels. Decorative wheels often differ from original equipment manufacturers' wheels, and thus, many decorative wheels do not fit on the lugs of the wheel drum of the manufacturer. Rather than car dealers stocking numerous types of decorative wheels to fit on each type of wheel drum, various wheel adapters have been developed.

Devices directed to wheel adapter systems to permit the fitting of wheels of various bolt patterns and diameters from different vehicle manufacturers are described in U.S. Pat. Nos. 2,570,559; 2,779,630; 2,970,008; 3,361,482; 3,759,576; 3,820,851; 3,834,766; 4,135,765; 4,165,904; 4,585,276; 5,785,391; 6,238,009; 6,626,502; and 6,685,275. Each of these wheel-adapter combinations suffers from one or more disadvantages. Certain adapters include protruding bolts which require particular lug nuts, thus limiting the compatibility of the adapter system for different vehicles and making the mounting and removal of these adapters cumbersome and time-consuming. Other adapters fail to provide adequate stability for the wheel when attached to the wheel hub.

Accordingly, there is a need for an adapter system for use with decorative wheels with a multitude of bolts that is usable with the majority of vehicles, and which offers quick and efficient assembly, stability and security.

SUMMARY

A wheel adapter system according to the present invention overcomes shortcomings of prior art assemblies. The system is adaptable for vehicles having multiple wheel hubs with a plurality of outwardly projecting threaded lugs. The system comprises a rim having a periphery for supporting a tire, the rim having a hub facing side and an opposed side, and a web plate for mounting on the opposed side of the web plate having a plurality of holes therethrough. there are a plurality of inwardly projecting mounting bolts for placement through the web plate holes.

The adapter has a mounting surface that preferably includes a recess for at least some of the bores so that the fasteners can be flush with the surface when installed. The lugs and bolts are preferably threaded. The fasteners preferably are internally threaded nuts.

Typically, the system is provided with multiple different adapters, each adapter having (i) a different first series of spaced apart mounting holes for receiving lugs of different wheel hubs, and (ii) the same second series of spaced apart mounting holes for receiving the bolts of the decorative wheel.

To use the wheel adapter system, a decorative wheel is first mounted onto the adapter by inserting the plurality of integral inwardly projecting mounting bolts from the web plate into the second series of spaced apart bores in the adapter. The fasteners are then used to secure the adapter to the lugs and bolts. The wheel-adapter assembly is then mounted on the wheel hub by inserting the outwardly projecting lugs of the wheel hub into the first series of spaced apart bores of the adapter. Fasteners are inserted in the bores of the adapter and secured on the lugs. Alternatively, before attaching fasteners, the lugs may be inserted into a series of holes in the web plate, depending on the type of wheel used.

By inserting both bolts and lugs into bores of the adapter, the adapter is securely fastened to both the wheel and wheel hub to increase stability and strength of the system. Assembly and disassembly of the wheel from the wheel hub is simple because the bolts protrude from the wheel, and not the adapter. Thus, a device is provided that allows simple and quick installation of various decorative wheels onto different wheel hubs.

DRAWINGS

These and other features, aspects and advantages of the present invention will become better understood from the following description, appended claims, and accompanying figures where:

FIG. 4 is a perspective view of the wheel adapter system with a slotted wheel mounted to the adapter of FIG. 1;

FIG. 5 is a perspective view of the adapter of FIG. 1;

DESCRIPTION

A wheel adapter system 10 embodying features of the present invention is shown in FIGS. 1-7. Although the wheel adapter system 10 includes many features of the present invention, it should be appreciated that only some of the features need to be used. Advantages of the present invention are obtainable with less than all of the described features.

The wheel adapter system 10 comprises a decorative wheel 12 and an adapter 14, with the adapter 14 secured between the wheel 12 and a wheel hub 16.

Figure 6:
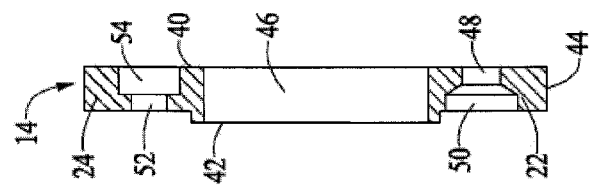
FIG. 6 is a sectional view of the adapter of FIG. 1.

Vehicle wheel hubs 16 are found on most types of automobiles, such as Dodge, Chevrolet, and Ford. The number of wheel hubs on a vehicle may vary. Referring to FIG. 6, there is shown a vehicle wheel system according to the present invention comprising a vehicle with four wheel hubs 16. There may be additional wheel hubs on a vehicle, however, such as a truck with six or eight wheel hubs.

DESCRIPTON

The wheel hub 16 generally has threaded protruding lugs 18 arranged in a bolt circle pattern. Each wheel hub 16 can include any number of protruding lugs. There may be four, five, six, or eight lugs 18 protruding from the wheel hub. The lugs 18 may also vary in diameter and length. The length of the lugs 18 typically ranges from 4 inches to 7 inches, and the diameters of the lugs 18 typically range from ¾ inch to 1 inch. The wheel hub 16 also comprises a knob 19 that protrudes from the center of the wheel hub and is surrounded by the lugs 18. The knob 19 varies in diameter depending on the make of the vehicle.

The decorative wheel 12 comprises a periphery or an outer rim 28 for supporting a tire (tire not shown). The rim has a hub facing side and an opposed side. A web plate 30 is integral with the rim 28, mounted on the opposed side of the rim. The web plate 30 includes a central portion 32, which supports mounting bolts 20 protruding inwardly through a plurality of holes therethrough. The bolts 20 are preferably equally spaced apart in a circular pattern and surround a cylindrical locator 36 in the central portion 32 of the web plate 30. The locator 36 extends through both surfaces of the web plate 30 to remain parallel to the bolts 20.

In a preferred embodiment, holes are drilled in the decorative wheel 12 for insertion of the mounting bolts 20 typically threaded, but press-end studs or machine screws can be used. Once inserted by either pressing or threading, the mounting bolts 20 are flush with the web plate 30. The number, diameter, and configuration of mounting bolts 20 protruding from each decorative wheel 12 may vary. Bolts 21 can be used to attach the web plate 30 to the rim 28.

The decorative wheel 12 can be in a variety of configurations. The wheel 12 may be a spoked wheel as in FIG. 3, with arms 34 extending outwardly from the central portion 32 of the web plate 30. In this configuration, the adapter is visible through the web plate. In another embodiment of the invention, as shown in FIG. 4, the central portion 32 of the web plate 30 comprises a plurality of holes 38 that extend from one surface of the web plate 30 to the opposed surface. The holes 38 receive the lugs 18 protruding from the wheel hub 16. The number, diameter, and configuration of the holes 38 may vary.

The adapter 14 of the present invention is annularly shaped and is fitted between the central portion 32 of the web plate 30 of the wheel 12 and the wheel hub 16. The adapter 14 comprises an inner face 40, an outer face 42, and a curved outer peripheral edge 44. The outer face 42 of the adapter 14 is adjacent to the central portion 32 of the wheel 12, and the inner face 40 is adjacent to the wheel hub 16. The adapter 14 has a cylindrically-shaped open center 46 to receive the knob 19 protruding from the wheel hub 16. Thus, the diameter of the open center 46 is drilled to correspond to the diameter of the wheel hub 16 knob 19.

The adapter 14 further comprises a plurality of bores comprising a first series of bores 22 for receiving the lugs 18 protruding from the wheel hub 16, and a second series of bores 24 for receiving the mounting bolts 20 protruding from the central portion 32 of the web plate 30 of the wheel 12. The bores 22, 24 extend between the inner 40 and outer faces 42 of the adapter 14. In a preferred embodiment, the bores 22, 24 are equally spaced apart in an annular pattern. The bores are recessed for insertion of the lugs 18, mounting bolts 20 and fasteners 26, so the adapter 14 may be securely fitted between the wheel 12 and hub 16. The bores are preferably formed by drilling, but can be formed by casting. Thus, the bores 22, 24 in the adapter 14 may be easily modified in number, diameter and configuration.

The first series of bores 22 receiving the lugs 18 are generally cylindrical and divided into two portions. A smaller portion 48 of each lug-receiving bore 22 is open at the inner face 40 of the adapter 14, and in a cylindrical configuration with a diameter large enough for insertion of any lug 18 protruding from a wheel hub 16, regardless of the make of the vehicle. The larger portion 50 of each lug-receiving bore 22 is open at the outer face 42 of the adapter 14, and has a recess with a diameter large enough for insertion of the fastener 26. The larger portion 50 of each lug-receiving bore 22 is tapered between the opening at the outer face 42 and the smaller portion 48 of the bore, thus allowing the fastener 26 to be secured tightly therein.

The second series of bores 24 receiving the mounting bolts 20 are also generally cylindrical with two portions. Each bolt-receiving bore 24 has a smaller portion 52 in a cylindrical configuration open on the outer face 42 of the adapter for receiving the bolt 20. The larger portion 54 of each bolt-receiving bore 24 is open at the inner face 40 of the adapter 14 and has a cylindrical recess with a diameter large enough for insertion of the bolt 20 and fastener 26. The cylindrical recess of the larger portion 54 is preferably tapered.

Figure 1:
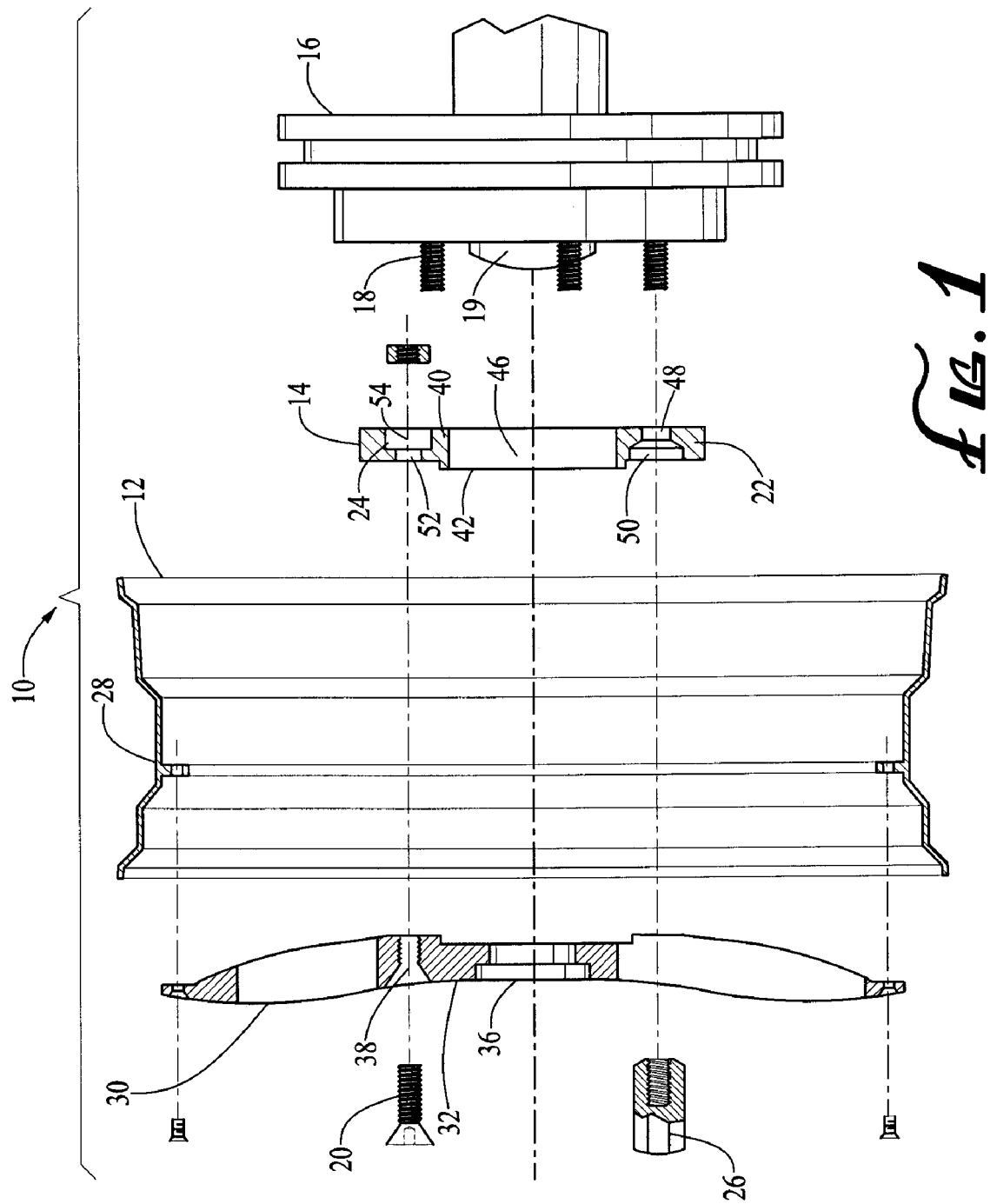
FIG. 1 is an exploded partially cut-away view of a wheel adapter system having features of the present invention, the system including a wheel hub, an adapter, and a wheel.
Figure 2:
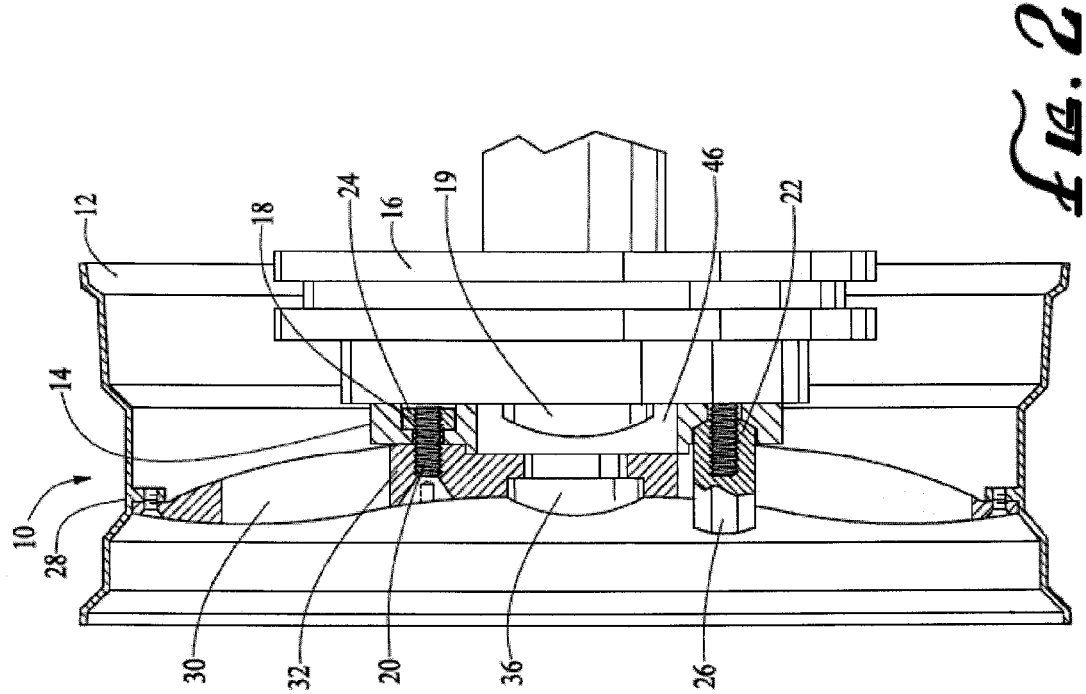
FIG. 2 is a partial sectional view of the wheel adapter system illustrated in FIG. 1 in an assembled form.
Figure 3:
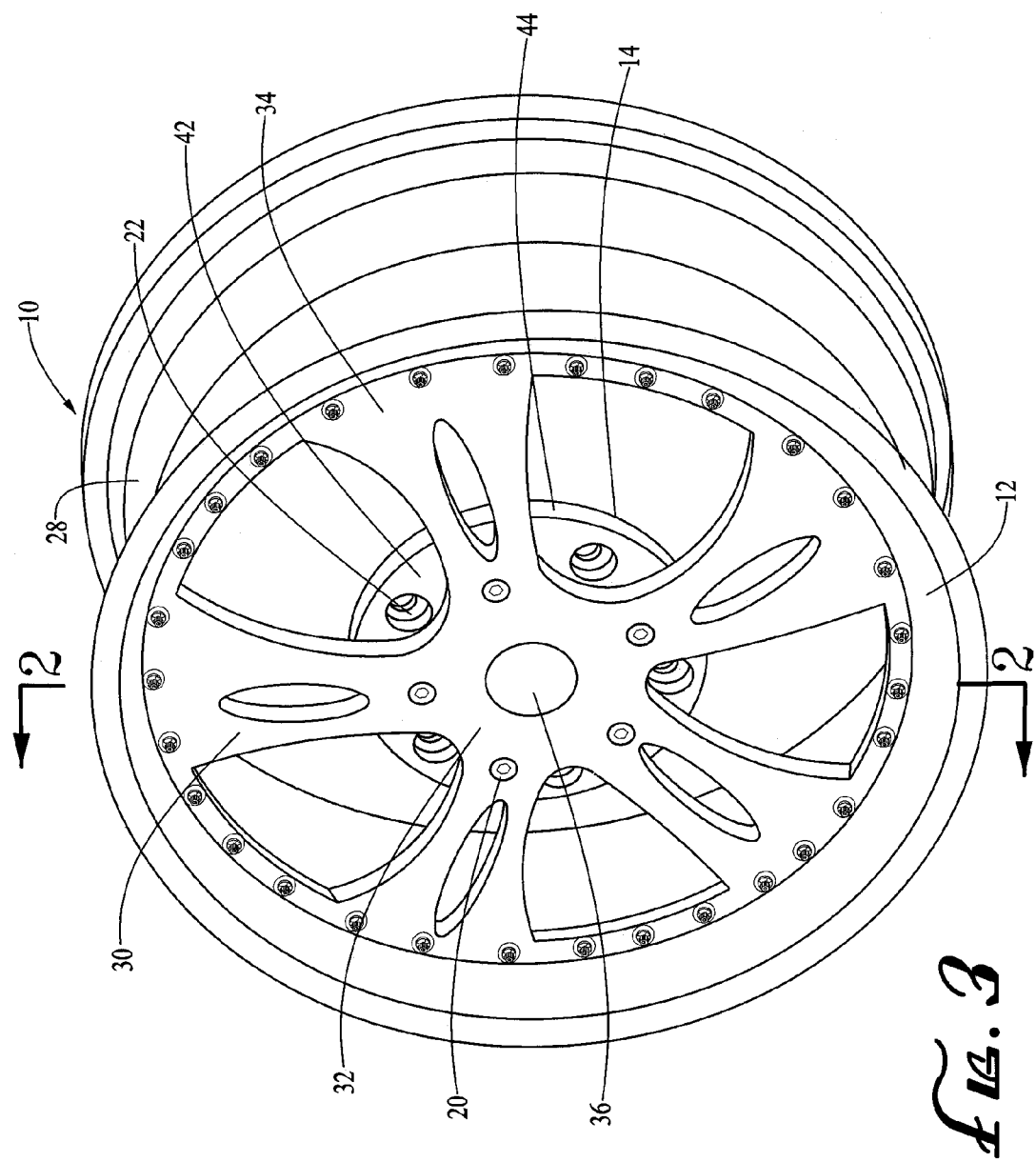
FIG. 3 is a perspective view of the wheel adapter system of FIG. 1 with a spoked wheel mounted to the adapter of FIG. 1.
Figure 7:
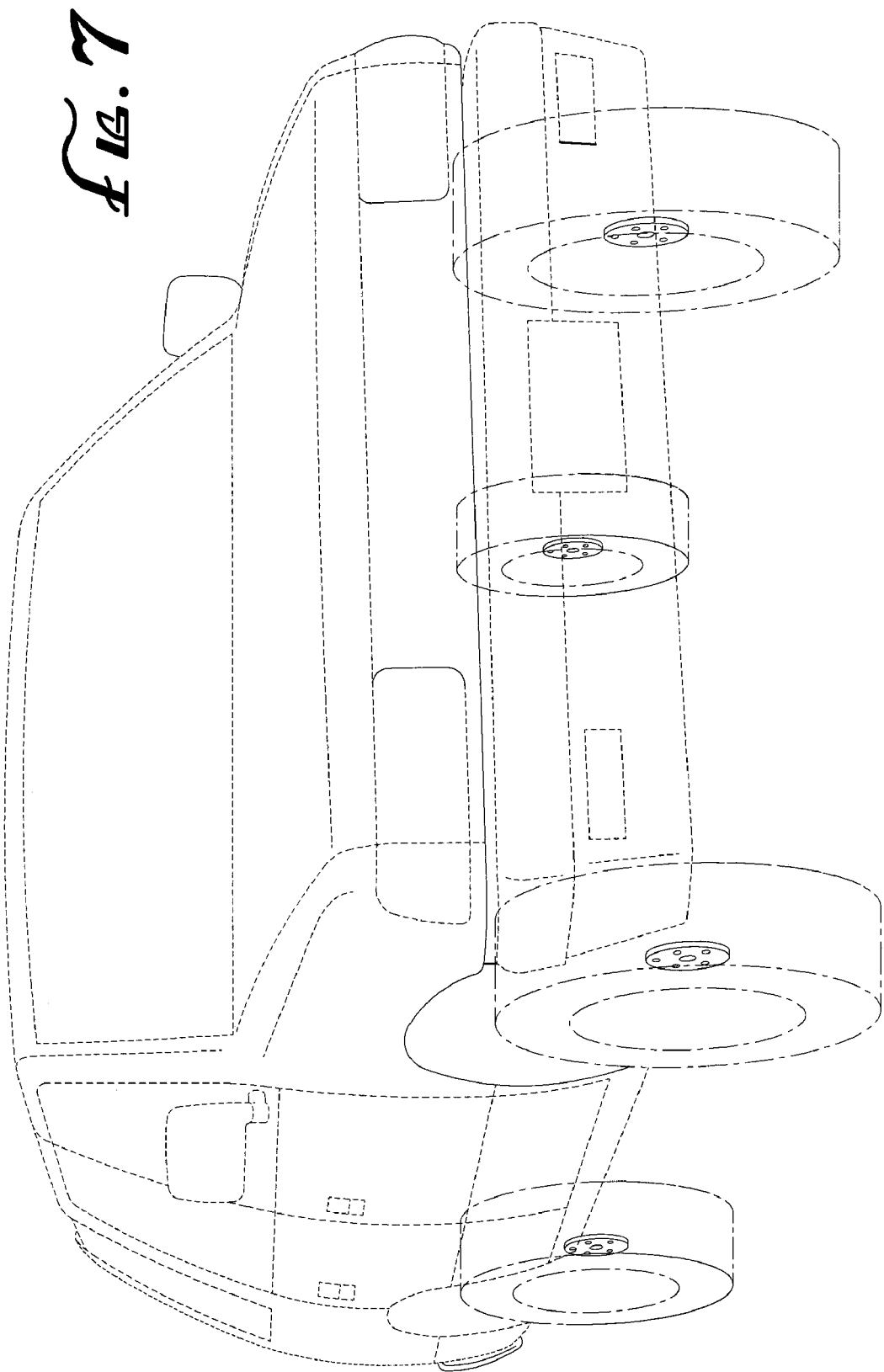
FIG. 7 is a perspective view of a vehicle with four wheel hubs and the wheel adapter system of FIG. 1.

The adapter 14 is held in place between the wheel 12 and hub 16 by appropriate fasteners 26. In a preferred embodiment as shown in FIGS. 1 and 2, the fasteners 26 are nuts. Sleeve nuts, tapered nuts or flat grade nuts may be used as fasteners. Furthermore, washers (not shown) may be interposed on the nuts on either the bolts 20 or lugs 18.

The adapter 14 and the decorative wheel 12 are constructed of a strong metal, such as steel, aluminum, or cast iron. They can be formed by machining or molding. The thickness of the adapter 14 may vary.

In use, the decorative wheel 12 with protruding mounting bolts 20 is aligned with the bolt-receiving bores 24 of the adapter 14. The bolt-receiving bores 24 are pre-formed to correspond with the number, diameter, and configuration of the bolts 20. The adapter 14 bores 24 are slightly larger than the circle diameter of the mounting bolts 20. Each bolt is inserted into the smaller portion 52 open on the outer face 42 of the adapter 14 and exits through the larger portion the larger portion 54 of the bore 24 at the inner face 40 of the adapter 14. The head of each bolt 20 is flush with the outer face 40 of the adapter 14. The locator 36 on the wheel 12 engages the open center 46 of the adapter 14 to center the adapter 14 on the wheel 12. If washers are used, they are then placed into each bore 24 and threaded onto the bolts 20. A fastener 26 such as a nut (as shown in FIGS. 1 and 2) is threaded on each bolt 20 by insertion into the larger portion 54 of each bore 24. The outer diameter of each nut corresponds to the inner diameter of each bore 22. Upon tightening, the nut is flush with the inner face 40 of the adapter.

The wheel hub 16 is then attached to the wheel-adapter assembly. One aligns the lugs 18 protruding from the wheel hub 16 with the first series of bores 22 of the adapter 14. The bores 22 are pre-formed to correspond to the number, diameter, and configuration of the lugs 18. The lugs 18 are first inserted into the smaller portion 48 of the bore 22 open at the inner face 40 of the adapter 14. The lug 18 exits the larger portion 50 of the bore 22 open at the outer face 42 of the adapter 14. At the same time as insertion of the lugs 18 into the bores 22, the knob 19 protruding from the wheel hub 16 is inserted into the open center 46 of the adapter 14. The diameter of the open center 46 is pre-formed to be slightly larger than the diameter of the knob 19 so the adapter 14 may be securely fit on the wheel hub 16. If washers are used, they are then placed onto the bores 22, 24 and threaded onto the lugs 18. A nut 56 is threaded on each lug 18 to fit securely within the larger portion 50 of the lug-receiving bore 22. The inner diameter of each bore 22 is slightly larger than the outer diameter of each nut 56. After the nut 56 is secure, it is flush with the outer face 42 of the adapter 14.

In another embodiment of the decorative wheel shown in FIG. 4, after insertion of the protruding lugs into the adapter, and prior to threading the nuts on the lugs, each lug is inserted into a hole 38 in the web plate 30 of the wheel 12, wherein each hole 38 is aligned with the lug-receiving bores 22 of the adapter 14. In a preferred embodiment, the holes 38 are cylindrically recessed for receiving the threaded lugs 18 protruding from the wheel hub 16. After insertion of the lugs 18 into the holes 38, a nut 56 is tightened on each of the lugs 18. Upon tightening, the nut 56 is flush with the surface of the wheel 12.

A system incorporating all of the features of the present invention has significant advantages. For example, the adapter is less expensive than in the prior art and applicable to all major models of automobiles. The adapter wheel system allows for quick, efficient assembly and stability and security for the wheel. The invention allows a user to mount on a wheel hub a wheel different than that of wheel originally attached to the wheel hub. The wheel adapter system enables various custom wheels to be placed on all major makes of vehicles using different types of inexpensive adapters.

Although the present invention has been described in considerable detail with reference to certain preferred versions thereof, other versions are possible. Therefore, the spirit and scope of the appended claims should not be limited to the description of the preferred versions contained herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" for "step" clause as specified in 35 U.S.C. §112.

What is claimed is:

1. A vehicle wheel system, comprising:
   (a) a wheel comprising:
      (i) a wheel plate having an inner face and an outer face, wherein the wheel plate comprises a plurality of holes in a central portion of the wheel plate, the holes comprising a first set of holes to accommodate outwardly projecting lugs of a vehicle wheel hub and a second set of holes to accommodate inwardly projecting mounting bolts; and
      (ii) a rim connected to the wheel plate for supporting a tire;
   (b) an adapter plate having an inner face and an outer face, wherein the adapter plate comprises a first set of holes to accommodate the outwardly projecting lugs and a second set of holes to accommodate the inwardly projecting mounting bolts; and
   (c) a plurality of mounting bolts placed through the second set of holes in the central portion of the wheel plate and through the second set of holes in the adapter plate in order to secure the outer face of the adapter plate to the inner face of the wheel plate.

2. The system of claim 1, further comprising fasteners attached to the inwardly projecting mounting bolts.

3. The system of claim 2, wherein the fasteners are flush with respect to the inner face of the adapter plate.

4. The system of claim 2, wherein the mounting bolts are threaded and the fasteners are internally threaded nuts.

5. The system of claim 1, wherein the adapter plate has an open center to receive a knob protruding outwardly from the wheel hub.

6. The system of claim 1, wherein each of the first set of holes of the adapter plate comprises a smaller diameter portion at the inner face of the adapter and a larger diameter portion at the outer face.

7. The system of claim 1, wherein each of the second set of holes of the adapter plate comprises larger diameter portion at the inner face of the adapter and smaller diameter portion at the outer face.

8. The system of claim 7, wherein the larger diameter portion is tapered.

9. A vehicle comprising the wheel system of claim 2, wherein the wheel and adapter are secured to a hub of the vehicle.

10. The vehicle of claim 9, wherein the vehicle is an automobile.

11. A method for attaching the wheel system of claim 2, to a hub of a vehicle, comprising:
    (a) placing outwardly projecting lugs of the hub through the first set of holes of the adapter plate, thereby placing the inner face of the adapter adjacent an outer face of the hub; and then
    (b) attaching fasteners to the lugs, thereby securing the wheel system to the vehicle.

12. The method of claim 11, wherein the adapter plate has an open center to receive a knob protruding outwardly from the wheel hub.

13. The method of claim 11, wherein the outwardly projecting lugs of the hub extend through the first set of holes of the wheel plate.

* * * * *